(12) United States Patent  (10) Patent No.: US 7,725,520 B2
Sakaguchi et al.  (45) Date of Patent: May 25, 2010

(54) PROCESSOR

(75) Inventors: Hiroaki Sakaguchi, Tokyo (JP); Koichi Hasegawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1165 days.

(21) Appl. No.: 11/274,233

(22) Filed: Nov. 16, 2005

(65) Prior Publication Data

US 2006/0112159 A1    May 25, 2006

(30) Foreign Application Priority Data

Nov. 22, 2004  (JP) ............................. 2004-337025

(51) Int. Cl.
G06F 7/32 (2006.01)
G06F 7/38 (2006.01)
(52) U.S. Cl. ...................... 708/520; 708/524
(58) Field of Classification Search ................ 708/520, 708/524, 603
See application file for complete search history.

(56) References Cited

U.S. PATENT DOCUMENTS 4,754,421 A * 6/1988 Bosshart ..................... 708/625
4,809,212 A * 2/1989 New et al. ................... 708/625
6,233,597 B1 * 5/2001 Tanoue et al. ............... 708/625
6,523,055 B1 * 2/2003 Yu et al. ..................... 708/603

FOREIGN PATENT DOCUMENTS

JP    2001-209824    8/2001
JP    2004-139156    5/2004

OTHER PUBLICATIONS

"IA-32 Intel(R) Architecture Software Developer's Manual vol. 1: Basic Architecture," Intel Corporation 2004.
"AltiVec Technology Programming Interface Manufal", Motorola, Inc., Jun. 1999.
Japanese Office Action issued Nov. 18, 2008 for corresponding Japanese Application No. 2004-337025.

* cited by examiner

Primary Examiner—Tan V Mai
(74) Attorney, Agent, or Firm—Rader, Fishman & Grauer PLLC

(57) ABSTRACT

The present invention provides a processor including data manipulating means for generating an arbitrary combination of elements of a first input vector and elements of a second input vector, arithmetic means for performing a product-sum operation on the combination, and repetition control means for controlling the generation of the combination by the data manipulating means and the product-sum operation by the arithmetic means according to a number of the elements of the first input vector and the second input vector.

15 Claims, 13 Drawing Sheets

FIG. 3

| FUNCTION CODE 210 | qmul | dot | add | sub | mul | div | cmp |
|---|---|---|---|---|---|---|---|
| NUMBER OF WRITING ELEMENTS (223) | "1" | "1" | SIZE 220 | SIZE 220 | SIZE 220 | SIZE 220 | SIZE 220 |
| NUMBER OF FIRST READING ELEMENTS (224) | SIZE 220 | SIZE 220 | SIZE 220 | SIZE 220 | SIZE 220 | SIZE 220 | SIZE 220 |
| NUMBER OF SECOND READING ELEMENTS (225) | SIZE 220 | SIZE 220 | SIZE 220 | SIZE 220 | SIZE 220 | SIZE 220 | SIZE 220 |
| NUMBER OF REPETITIONS (226) | SIZE 220 | "1" | "1" | "1" | "1" | "1" | "1" |

FIG. 6

| | 1 | 2 | 3 | 4 |
|---|---|---|---|---|
| REPETITION COUNT 519 | | | | |
| WRITING ENABLE X (1511) | 1 | 0 | 0 | 0 |
| WRITING ENABLE Y (1512) | 0 | 1 | 0 | 0 |
| WRITING ENABLE Z (1513) | 0 | 0 | 1 | 0 |
| WRITING ENABLE W (1514) | 0 | 0 | 0 | 1 |
| READING REARRANGEMENT (154) | WZYX | ZWXY | YXWZ | XYZW |
| READING SIGN INVERSION (155) | PPNP | NPPP | PNPP | NNNP |
| ARITHMETIC UNIT SPECIFICATION (156) | 5 | 5 | 5 | 5 |

| NUMBER OF WRITING ELEMENTS | 1 | 2 | 3 | 4 |
|---|---|---|---|---|
| 1511 WRITING ENABLE X | 1 | 1 | 1 | 1 |
| 1512 WRITING ENABLE Y | 0 | 1 | 1 | 1 |
| 1513 WRITING ENABLE Z | 0 | 0 | 1 | 1 |
| 1514 WRITING ENABLE W | 0 | 0 | 0 | 1 |

| WRITING ELEMENT SPECIFICATION | X | Y | Z | W |
|---|---|---|---|---|
| 1511 WRITING ENABLE X | 1 | 0 | 0 | 0 |
| 1512 WRITING ENABLE Y | 0 | 1 | 0 | 0 |
| 1513 WRITING ENABLE Z | 0 | 0 | 1 | 0 |
| 1514 WRITING ENABLE W | 0 | 0 | 0 | 1 |

FIG. 8

| FUNCTION CODE 210 | add | sub | mul | div | cmp | dot | |
|---|---|---|---|---|---|---|---|
| REPETITION COUNT | 1 | 1 | 1 | 1 | 1 | 1 | 519 |
| READING REARRANGEMENT | XYZW | XYZW | XYZW | XYZW | XYZW | XYZW | 154 |
| READING SIGN INVERSION | PPPP | PPPP | PPPP | PPPP | PPPP | PPPP | 155 |
| ARITHMETIC UNIT SPECIFICATION | 0 | 1 | 2 | 3 | 4 | 5 | 156 |

FIG. 11

| | 1 | 2 | 3 | 4 |
|---|---|---|---|---|
| NUMBER OF READING ELEMENTS  224,225 | | | | |
| READING ENABLE X  2241,2251 | 1 | 1 | 1 | 1 |
| READING ENABLE Y  2242,2252 | 0 | 1 | 1 | 1 |
| READING ENABLE Z  2243,2253 | 0 | 0 | 1 | 1 |
| READING ENABLE W  2244,2254 | 0 | 0 | 0 | 1 |

PROCESSOR

CROSS REFERENCES TO RELATED APPLICATIONS

The present invention contains subject matter related to Japanese Patent Application JP 2004-337025 filed in the Japanese Patent Office on Nov. 22, 2004, the entire contents of which being incorporated herein by reference.

BACKGROUND OF THE INVENTION

The present invention relates to a SIMD (Single Instruction Multiple Data) type processor, and particularly to a SIMD type processor that handles three-dimensional vectors or quaternions.

A number referred to as a quaternion is used to perform object rotation, spherical interpolation, and the like in a three-dimensional graphics process. The quaternion is a three-dimensional vector added to a scalar value, and represents an axis in a three-dimensional space and rotation on the axis. A quaternion P is represented by a scalar value p and a three-dimensional vector U as follows.

$$P=[p; U]$$

Setting p=Aw and U=(Ax, Ay, Az), and using imaginary units i, j, and k, the quaternion P is also represented as follows.

$$P=Aw+Axi+Ayj+Azk$$

The imaginary units i, j, and k have the following relations.

$$ii=jj=kk=ijk=-1$$

$$ij=k$$

$$ji=-k$$

Similarly, setting a quaternion Q as Q=[q; V], and setting q=Bw and V=(Bx, By, Bz), $$Q=Bw+Bxi+Byj+Bzk$$

A quaternion product PQ of the quaternion P and the quaternion Q is obtained by $$\begin{aligned} PQ = &(-AxBx - AyBy - AzBz + AwBw) \\ &+ (AxBw + AyBz - AzBy + AwBx)i \\ &+ (-AxBz + AyBw + AzBx + AwBy)j \\ &+ (AxBy - AyBx + AzBw + AwBz)k \\ = &Mw + Mxi + Myj + Mzk \end{aligned} \quad \text{(Equation 1)}$$

Sixteen multiplications and 12 additions and subtractions are required to obtain the components (Mw, Mx, My, and Mz) of such a quaternion product. When these operations are to be performed simultaneously, a necessary circuit scale may be increased.

When the two quaternions are treated as two four-dimensional vectors, the components (Mw, Mx, My, and Mz) of the quaternion product are each given in the form of a sum of products of elements (Aw, Ax, Ay, and Az and Bw, Bx, By, and Bz) of the two four-dimensional vectors. However, the order and signs of the sum of products differ for each component. Hence, when there is a circuit that can perform rearrangement of the elements of the four-dimensional vectors and perform sign inversion simultaneously with product-sum operation, the quaternion product can be expressed by four product-sum operations.

With a 32-bit instruction code, however, the number of bits is not sufficient to represent a vector operation instruction with three operands while including information on rearrangement and sign inversion in an instruction field. Therefore means are often used which realize vector rearrangement and sign inversion by another instruction, store a new vector resulting from the rearrangement and the sign inversion in another register, and then perform operation using the register.

For example, an instruction to perform such vector rearrangement and sign inversion is provided in an instruction set SSE (Streaming SIMD Extensions) for multimedia, which instruction set has been developed by Intel Corporation, an instruction set AltiVec for multimedia, which instruction set has been developed by Motorola Inc., and the like (see Non-Patent Literature, "IA-32 Intel(R) Architecture Software Developer's Manual Volume 1: Basic Architecture," Intel Corporation, 2004 and Non-Patent Literature, "AltiVec Technology Programming Interface Manual," Motorola Inc., June 1999)

SUMMARY OF THE INVENTION

However, in calculating a quaternion product, even when an instruction to perform vector rearrangement and sign inversion as described above is used, it is necessary to apply an instruction to further perform vector rearrangement and sign inversion on each of four inner products, thus increasing program size.

It is accordingly desirable to provide a SIMD type processor that calculates a quaternion product in response to a single instruction.

According to a first embodiment of the present invention, there is provided a processor including data manipulating means for generating an arbitrary combination of elements of a first input vector and elements of a second input vector, arithmetic means for performing a product-sum operation on the combination, and repetition control means for controlling the generation of the combination by the data manipulating means and the product-sum operation by the arithmetic means according to a number of the elements of the first input vector and the second input vector. Thereby an effect is provided in that product-sum operation is performed repeatedly on an arbitrary combination of the elements of the first input vector and the second input vector. That is, even when the combination for the product-sum operation of the elements of the vectors is complex as in the case of a quaternion product instruction, for example, repetition control by the repetition control means enables the calculation of a quaternion product to be completed as a process in response to one instruction.

In the first embodiment, the repetition control means can include rearranging means for rearranging the elements of the second input vector under control of the repetition control means, and sign inverting means for inverting a sign of an output of the rearranging means under control of the repetition control means. Thereby an effect is produced in that an arbitrary combination of the elements of the first input vector and the second input vector is generated flexibly in terms of order and sign.

Further, the repetition control means can include counting means for counting a number of times corresponding to the number of the elements, and operation control means for controlling the rearranging means and the sign inverting means according to a count value of the counting means.

Thereby an effect is produced in that product-sum operation is performed repeatedly on an arbitrary combination of the elements of the vectors.

In the first embodiment, the second input vector can have four elements (Bx, By, Bz, and Bw), and the data manipulating means can sequentially generate a first sequence (Bw, Bz, −By, and Bx), a second sequence (−Bz, Bw, Bx, and By), a third sequence (By, −Bx, Bw, and Bz), and a fourth sequence (−Bx, −By, −Bz, and Bw) under control of the repetition control means. Thereby an effect is produced in that one of the vectors for calculating a quaternion product is supplied.

Further, the first input vector can have four elements (Ax, Ay, Az, and Aw), and the arithmetic means can sequentially perform a first product-sum operation (AxBw+AyBz−AzBy+AwBx), a second product-sum operation (−AxBz+AyBw+AzBx+AwBy), a third product-sum operation (AxBy−AyBx+AzBw+AwBz), and a fourth product-sum operation (−AxBx−AyBy−AzBz+AwBw) under control of the repetition control means. Thereby an effect is produced in that each element in the quaternion product is supplied.

In the first embodiment, the processor can further include size processing means for setting zero to elements exceeding the number of the elements of each of the first input vector and the second input vector. Thereby an effect is produced in that a proper result of product-sum operation is calculated even when the number of the elements of the first input vector and the second input vector is small.

According to a second embodiment of the present invention, there is provided a processor including vector retaining means for retaining a first input vector and a second input vector, data manipulating means for generating an arbitrary combination of elements of the first input vector and elements of the second input vector, arithmetic means for performing a product-sum operation on the combination, and repetition control means for controlling the generation of the combination by the data manipulating means and the product-sum operation by the arithmetic means according to a number of the elements of the first input vector and the second input vector, and making a result of the product-sum operation retained as a predetermined element in an output vector of the vector retaining means. Thereby an effect is provided in that product-sum operation is performed repeatedly on an arbitrary combination of the elements of the first input vector and the second input vector retained by the vector retaining means.

According to a third embodiment of the present invention, there is provided a processor including vector retaining means for retaining a first input vector having four elements (Ax, Ay, Az, and Aw) and a second input vector having four elements (Bx, By, Bz, and Bw), extracting means for extracting a number of the elements of the first input vector and the second input vector in an instruction to perform an operation between the first input vector and the second input vector, first supplying means for supplying the elements (Ax, Ay, Az, and Aw) of the first input vector, second supplying means for supplying a first sequence (Bw, Bz, −By, and Bx), a second sequence (−Bz, Bw, Bx, and By), a third sequence (By, −Bx, Bw, and Bz), and a fourth sequence (−Bx, −By, −Bz, and Bw) of the elements of the second input vector, and arithmetic means for sequentially performing a first product-sum operation (AxBw+AyBz−AzBy+AwBx), a second product-sum operation (−AxBz+AyBw+AzBx+AwBy), a third product-sum operation (AxBy−AyBx+AzBw+AwBz), and a fourth product-sum operation (−AxBx−AyBy−AzBz+AwBw) on a basis of the elements of the first input vector and the second input vector, the elements of the first input vector and the second input vector being supplied from the first supplying means and the second supplying means, when the number of the elements is four, and making the vector retaining means retain results of the product-sum operations. Thereby an effect is provided in that each element of a quaternion product is generated sequentially by setting the number of elements to four.

In the third embodiment, the arithmetic means can sequentially generate a first outer product element (AyBz−AzBy), a second outer product element (−AxBz+AzBx), and a third outer product element (AxBy−AyBx) on a basis of the elements of the first input vector and the second input vector, the elements of the first input vector and the second input vector being supplied from the first supplying means and the second supplying means, when the number of the elements is three, and make the vector retaining means retain the outer product elements. Thereby an effect is provided in that each element of an outer product is generated sequentially by setting the number of elements to three.

According to a fourth embodiment of the present invention, there is provided a processor having, as an instruction set, an instruction to perform an operation between a first input vector having four elements (Ax, Ay, Az, and Aw) and a second input vector having four elements (Bx, By, Bz, and Bw). The processor includes extracting means for extracting a number of the elements of the first input vector and the second input vector in the instruction to perform the operation between the first input vector and the second input vector, and arithmetic means for sequentially performing a first product-sum operation (AxBw+AyBz−AzBy+AwBx), a second product-sum operation (−AxBz+AyBw+AzBx+AwBy), a third product-sum operation (AxBy−AyBx+AzBw+AwBz), and a fourth product-sum operation (−AxBx−AyBy−AzBz+AwBw) on a basis of the elements of the first input vector and the second input vector when the number of the elements is four, and calculating a quaternion product. Thereby an effect is provided in that the processor is made to execute an instruction to generate each element of a quaternion product sequentially by setting the number of elements to four.

In the fourth embodiment, the arithmetic means can sequentially generate a first outer product element (AyBz−AzBy), a second outer product element (−AxBz+AzBx), and a third outer product element (AxBy−AyBx) on a basis of the elements of the first input vector and the second input vector when the number of the elements is three, and calculate an outer product. Thereby an effect is provided in that the processor is made to execute an instruction to generate each element of an outer product sequentially by setting the number of elements to three.

The present invention can produce an excellent effect of calculating a quaternion product in response to a single instruction.

BRIEF DESCRIPTION OF THE DRAWINGS

FIG. 3 is a diagram showing relations between a function code and a size in the embodiment of the present invention;

FIG. 6 is a diagram of an example of control performed by the repetition control circuit for a quaternion product instruction in the embodiment of the present invention;

FIGS. 7A and 7B are diagrams of an example of control performed by the repetition control circuit for another operation instruction in the embodiment of the present invention;

FIG. 8 is a diagram of another example of control performed by the repetition control circuit for another operation instruction in the embodiment of the present invention;

FIG. 11 is a diagram showing an example of contents of selection signals in the size processing circuit in the embodiment of the present invention;

DETAILED DESCRIPTION OF THE PREFERRED EMBODIMENT

A preferred embodiment of the present invention will next be described in detail with reference to the drawings.

Figure 1:
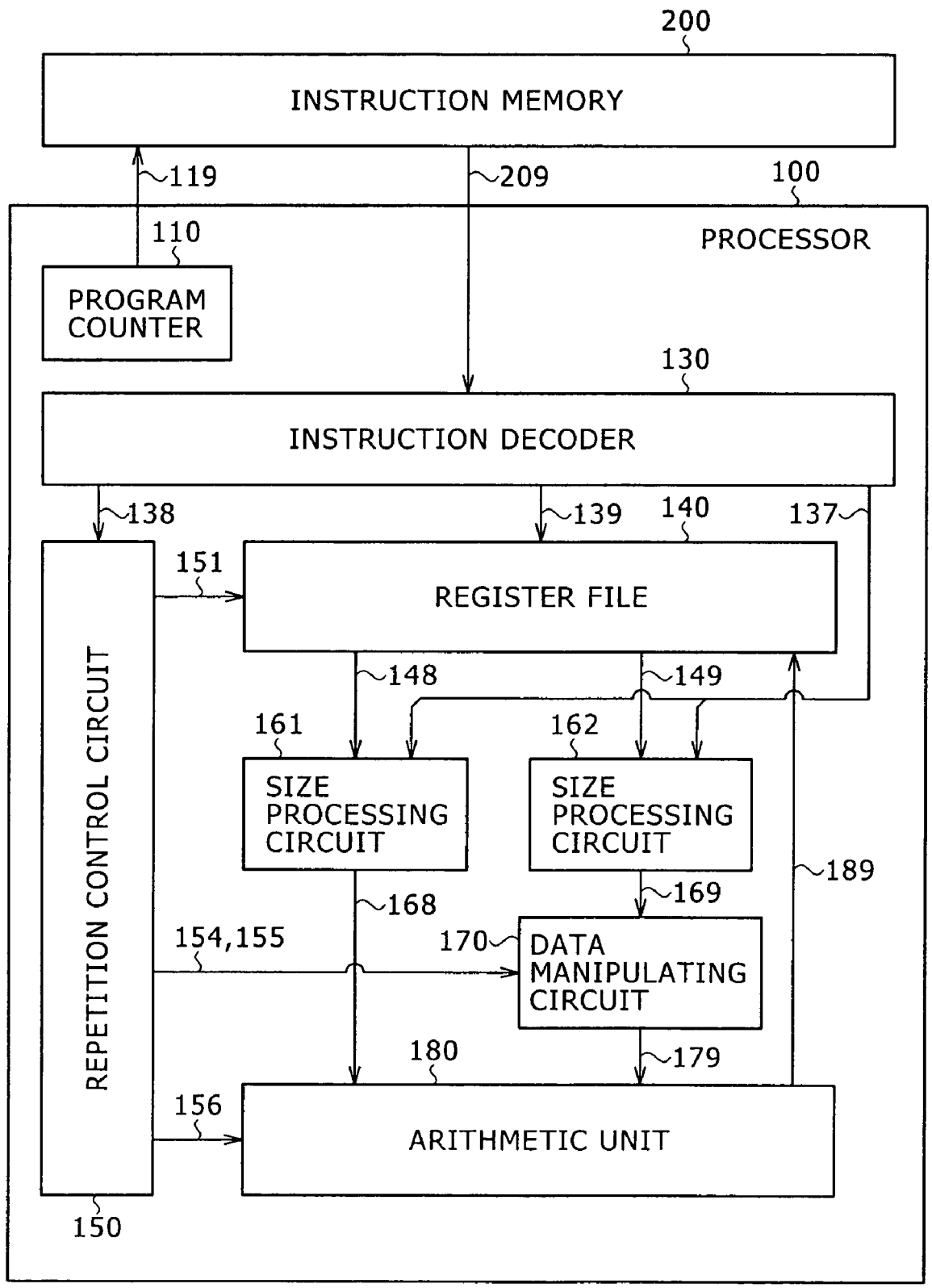
FIG. 1 is a diagram showing an example of configuration of a SIMD type computer system according to an embodiment of the present invention.

FIG. 1 is a diagram showing an example of configuration of a SIMD type computer system according to an embodiment of the present invention. This SIMD type computer system includes a processor 100 and an instruction memory 200. The processor 100 includes a program counter 110, an instruction decoder 130, a register file 140, a repetition control circuit 150, size processing circuits 161 and 162, a data manipulating circuit 170, and an arithmetic unit 180. The processor 100 is connected to the instruction memory 200, or includes the instruction memory 200.

The program counter 110 counts addresses at which an instruction is read in the instruction memory 200. An instruction is read from the instruction memory 200 on the basis of an address specified by the program counter 110 via a signal line 119, and supplied to the instruction decoder 130 via a signal line 209. The instruction decoder 130 decodes the instruction read from the instruction memory 200 to extract the operation code of the instruction and an operand necessary for the instruction.

The register file 140 is accessed by an operand supplied from the instruction decoder 130 via a signal line 139, and reading and writing are performed in the register file 140. The register file 140 can read two sets of data simultaneously. The register file 140 supplies the two sets of data to the size processing circuits 161 and 162 via signal lines 148 and 149, respectively.

The repetition control circuit 150 receives a decoded signal via a signal line 138. According to the signal, the repetition control circuit 150 controls the register file 140 via a signal line 151, controls the data manipulating circuit 170 via signal lines 154 and 155, and controls the arithmetic unit 180 via a signal line 156. When an operation needs to be repeated a plurality of times as in the case of a quaternion product, the repetition control circuit 150 controls the repetitions.

The size processing circuits 161 and 162 each receive an operand (data) read from the register file 140, and perform size processing in which a value "0" is set in a part of the input data which part exceeds the number of elements (size) given via a signal line 137.

The data manipulating circuit 170 receives the operand resulting from size processing by the size processing circuit 162 via a signal line 169, and performs data manipulation such as data reordering, sign inversion, and the like. The operand resulting from such data manipulation is supplied to the arithmetic unit 180 via a signal line 179.

The arithmetic unit 180 performs a predetermined operation on the operands supplied via a signal line 168 and the signal line 179 under control of the repetition control circuit 150 via the signal line 156. A result of the operation by the arithmetic unit 180 is written to the register file 140 via a signal line 189 under control of the repetition control circuit 150 via the signal line 156.

Figure 2:
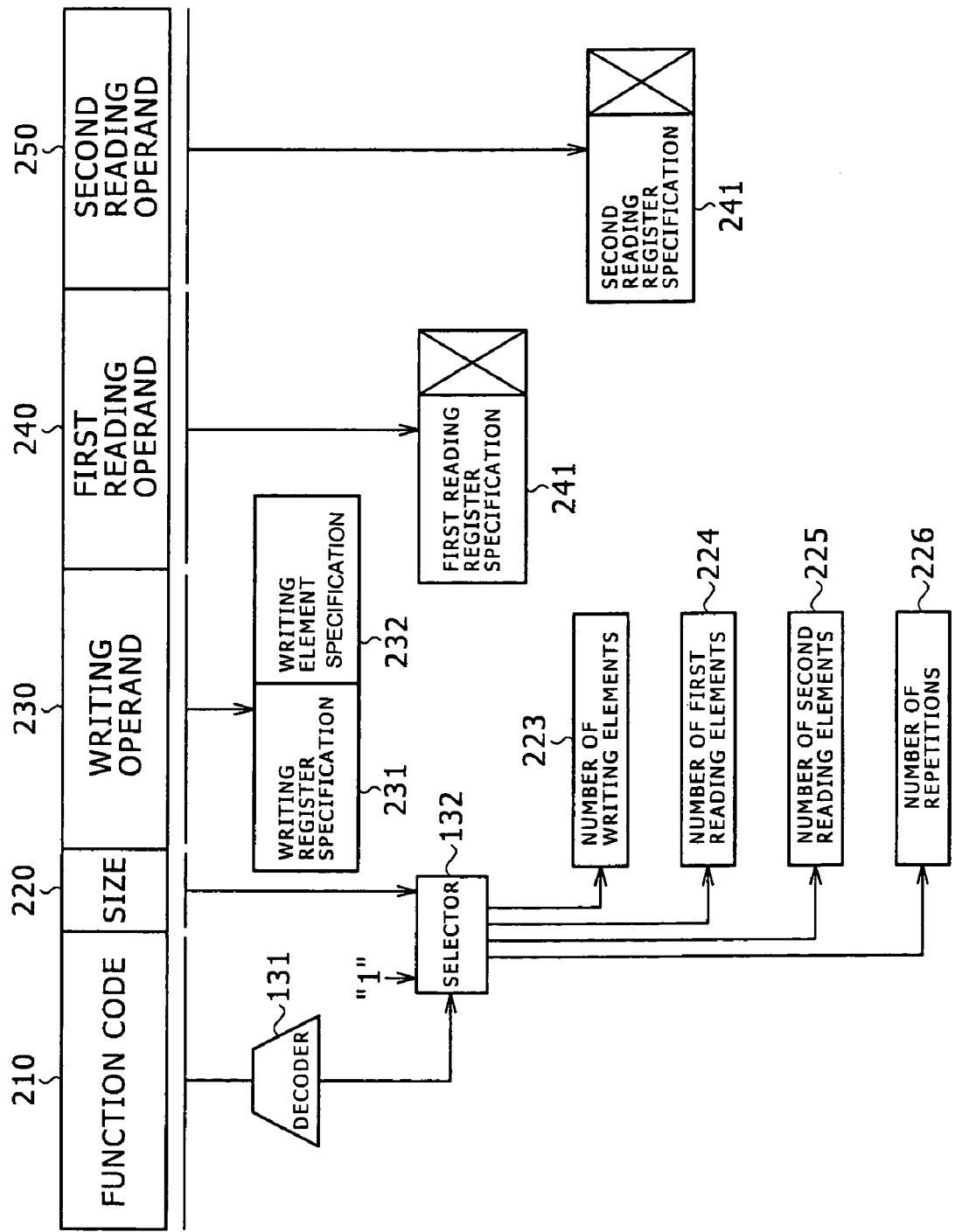
FIG. 2 is a diagram showing an example of an instruction format in the embodiment of the present invention.

FIG. 2 is a diagram showing an example of an instruction format in the embodiment of the present invention. Assume in this case a 32-bit fixed-length instruction having three operands as a RISC (Reduced Instruction Set Computer) architecture type instruction set. The processor 100 is implemented as a SIMD type processor that performs a maximum of four operations in parallel on the basis of the fixed-length instruction. It is to be noted that while description in the following will be made assuming simultaneous performance of four operations as an example, the present invention is not limited to this, and an arbitrary number of operations may be performed simultaneously.

This instruction format has a function code 210, a size 220, a writing operand 230, a first reading operand 240, and a second reading operand 250. The function code 210 represents the operation code of the instruction, and represents a type of operation in the arithmetic unit 180 in the embodiment of the present invention. The size 220 indicates the number of elements of data to be subjected to an operation, and is used to control parts according to the function code 210. Specifically, depending on a result of decoding by a decoder 131, a selector 132 selects one of the contents of the size 220 and a value "1," whereby the number of writing elements 223, the number of first reading elements 224, the number of second reading elements 225, and the number of repetitions 226 are determined. The number of writing elements 223 is the number of elements when data is written to the register file 140. The number of first reading elements 224 and the number of second reading elements 225 are each the number of elements when data is read from the register file 140. The number of repetitions 226 is the number of repetitions when the repetition control circuit 150 performs repeated control. FIG. 3 shows the contents selected by the selector 132.

Referring to FIG. 3, the selected contents of the number of writing elements 223, the number of first reading elements 224, the number of second reading elements 225, and the number of repetitions 226 are shown in correspondence with the function code 210. The function code 210 in this case includes a quaternion product (qmul), an inner product (dot), an addition (add), a subtraction (sub), a multiplication (mul), a division (div), and a comparison (cmp).

In the case of a quaternion product, for example, a value "1" is given as the number of writing elements 223, and the contents of the size 220 are given as the number of first reading elements 224, the number of second reading elements 225, and the number of repetitions 226.

Referring to FIG. 2 again, the writing operand 230 indicates a writing address in the register file 140, and retains a writing register specification 231 and a writing element specification 232. When a plurality of registers that each integrate a plurality of elements into one set are retained in the register file 140, a register to be written is specified by the writing register specification 231, and an element in that register is specified by the writing element specification 232.

The first reading operand 240 and the second reading operand 250 indicate a reading address at which reading from the register file 140 is performed, and include a first reading register specification 241 and a second reading register specification 251, respectively. In the embodiment of the present invention, it suffices to specify a register to be read, and it is not particularly necessary to specify elements in that register. Therefore a field for element specification is not provided.

Supposing that 32 words of registers that integrate four elements into one set, for example, are retained as the configuration of the register file 140, five bits are necessary for register specification, and two bits are necessary for element specification. Supposing that fields are assigned to the operands equally, seven bits are assigned to each of the writing operand 230, the first reading operand 240, and the second reading operand 250. Since the size 220 represents the number of elements in a register, two bits are assigned to the size 220. Thus, in this case, nine bits of the 32 bits can be assigned to the function code 210.

Figure 4:
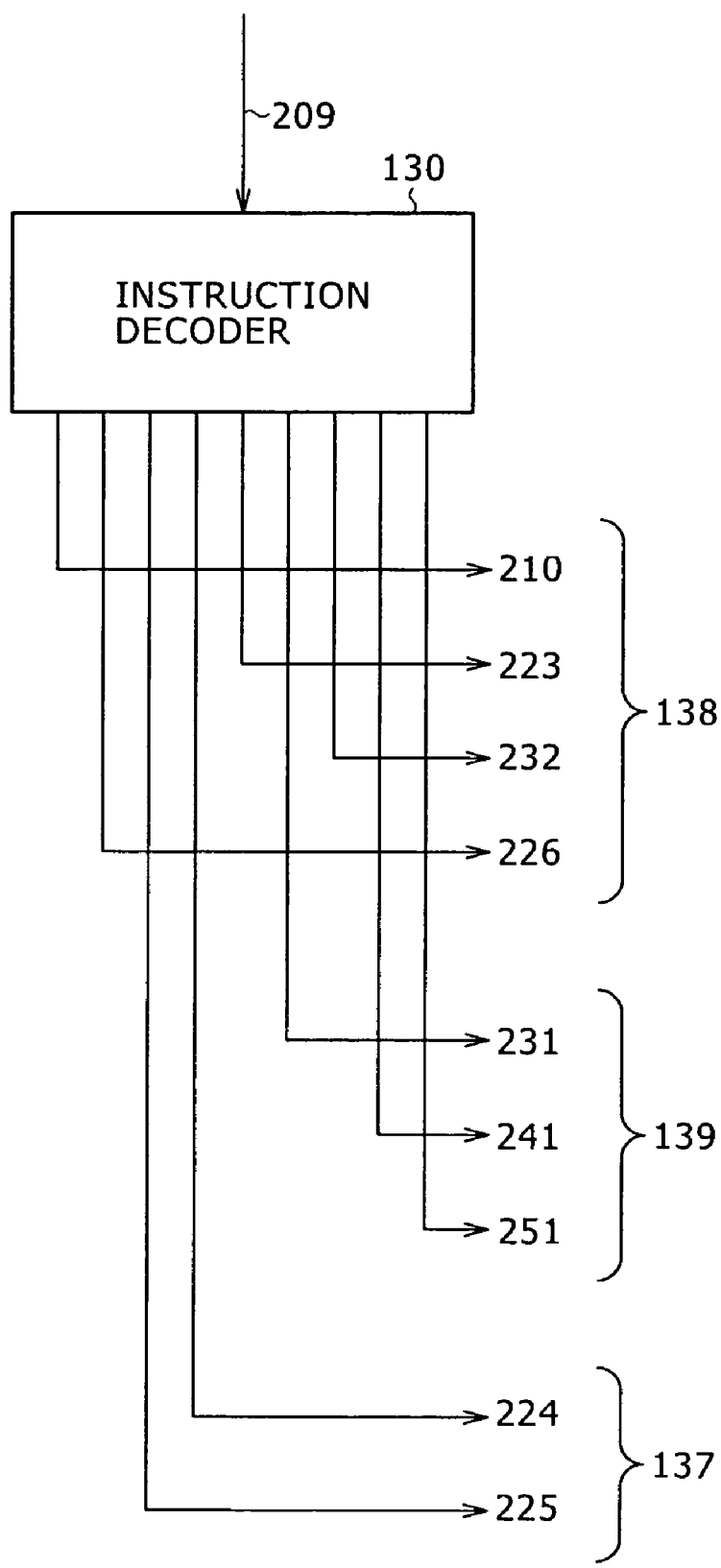
FIG. 4 is a diagram representing an example of decoding by an instruction decoder in the embodiment of the present invention.

FIG. 4 is a diagram representing an example of decoding by the instruction decoder 130 in the embodiment of the present invention. The instruction decoder 130 decodes an instruction read from the instruction memory 200 via the signal line 209 to extract the following fields. Specifically, the instruction decoder 130 outputs the function code 210, the number of writing elements 223, the writing element specification 232, and the number of repetitions 226 to the signal line 138. In addition, the instruction decoder 130 outputs the writing register specification 231, the first reading register specification 241, and the second reading register specification 251 to the signal line 139. Further, the instruction decoder 130 outputs the number of first reading elements 224 and the number of second reading elements 225 to the signal line 137.

Figure 5:
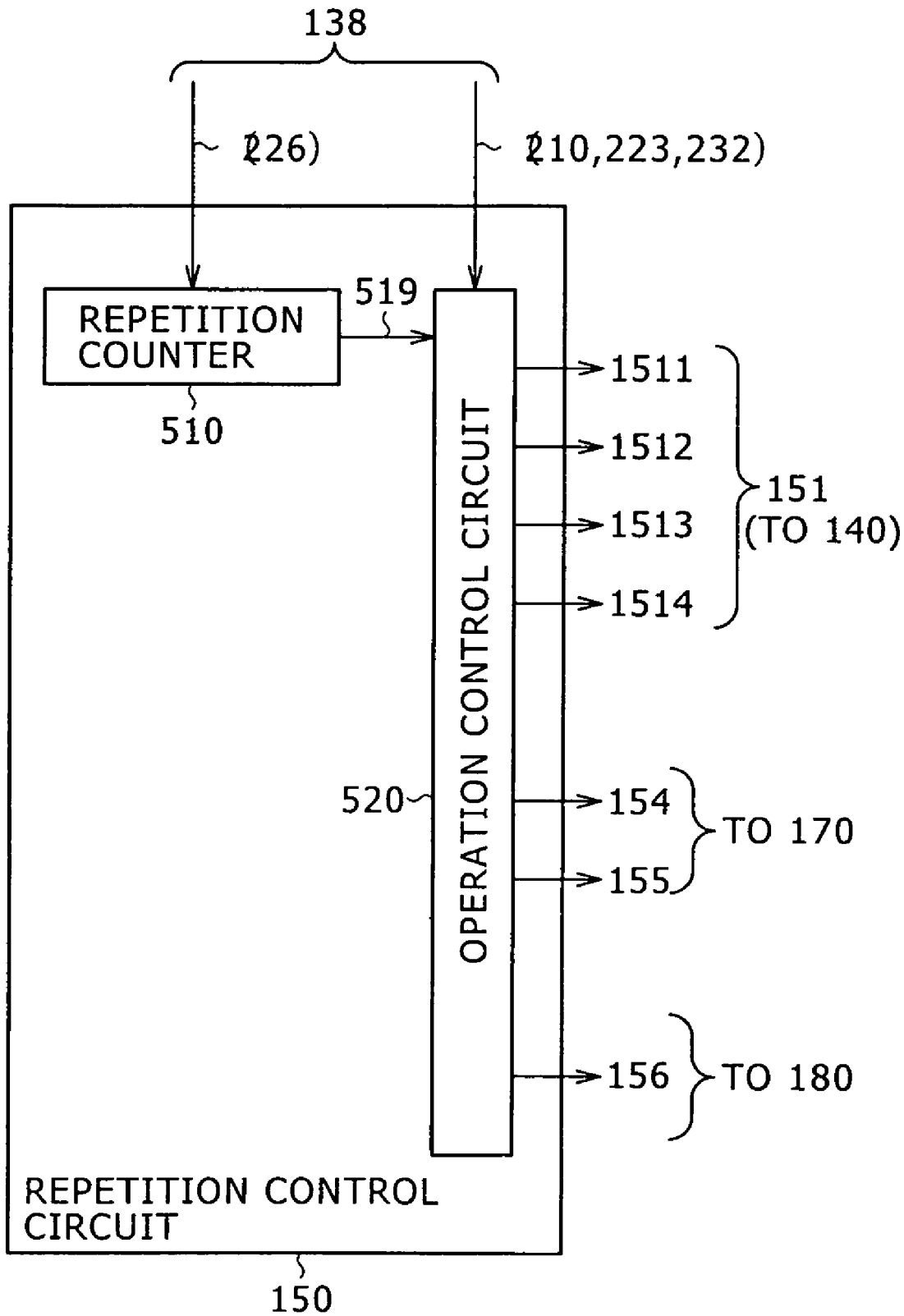
FIG. 5 is a diagram showing an example of configuration of a repetition control circuit in the embodiment of the present invention.

FIG. 5 is a diagram showing an example of configuration of the repetition control circuit 150 in the embodiment of the present invention. The repetition control circuit 150 includes a repetition counter 510 and an operation control circuit 520.

Receiving the number of repetitions 226 in the signal line 138, the repetition counter 510 counts from an initial value "1" to the number of repetitions 226 in increments of one, and supplies the count value to the operation control circuit 520 via a signal line 519.

The operation control circuit 520 outputs a writing enable to the signal line 151, a reading rearrangement to the signal line 154, a reading sign inversion to the signal line 155, and an arithmetic unit specification to the signal line 156 on the basis of the function code 210, the number of writing elements 223, and the writing element specification 232 in the signal line 138 and the repetition count in the signal line 519.

The writing enable in the signal line 151 has one bit provided for each element position in the register file 140. For example, when a register that integrates for example four elements into one set is retained as a configuration of the register file 140, the writing enable in the signal line 151 is formed by four bits 1511 to 1514. The writing enable in the signal line 151 is supplied to the register file 140.

The reading rearrangement in the signal line 154 and the reading sign inversion in the signal line 155 are supplied to the data manipulating circuit 170. The arithmetic unit specification in the signal line 156 is supplied to the arithmetic unit 180.

FIG. 6 is a diagram of an example of control performed by the repetition control circuit 150 for a quaternion product instruction in the embodiment of the present invention. When the function code 210 indicates a quaternion product (qmul), the operation control circuit 520 generates control signals according to the repetition count in the signal line 519.

First, regarding the writing enable in the signal line 151, when the repetition count in the signal line 519 indicates a value "1," only a first bit in the signal line 151 is a value "1," and other bits are a value "0." Thus, when the repetition count in the signal line 519 indicates the value "1," a result of operation in the arithmetic unit 180 is written to only a first element in a writing register. When the repetition count in the signal line 519 indicates a value "2," only the second bit in the signal line 151 is the value "1," and the other bits are the value "0." Thus, when the repetition count in the signal line 519 indicates the value "2," a result of operation in the arithmetic unit 180 is written to only a second element in the writing register. Similarly, when the repetition count in the signal line 519 indicates a value "3," a result of operation in the arithmetic unit 180 is written to only a third element in the writing register. When the repetition count in the signal line 519 indicates a value "4," a result of operation in the arithmetic unit 180 is written to only a fourth element in the writing register.

The reading rearrangement in the signal line 154 signifies that when an original state is "XYZW," read data is to be rearranged into a state specified by the reading rearrangement in the signal line 154. When the repetition count in the signal line 519 indicates the value "1," the reading rearrangement in the signal line 154 indicates "WZYX," and thus signifies that the read data is to be rearranged in reverse order to the original order of arrangement. When the repetition count in the signal line 519 indicates the value "2," the reading rearrangement in the signal line 154 indicates "ZWXY," and thus signifies that the read data is to be rearranged such that a first piece of data becomes a third piece of data, a second piece of data becomes a fourth piece of data, a third piece of data becomes a first piece of data, and a fourth piece of data becomes a second piece of data. Similarly, when the repetition count in the signal line 519 indicates the value "3," the read data is rearranged into "YXWZ." When the repetition count in the signal line 519 indicates the value "4," the read data is output in a state of "XYZW" (that is, the input is output as it is).

The reading sign inversion in the signal line 155 indicates that sign inversion is not performed on data that has undergone the above-described rearrangement when a corresponding symbol is "P," and that sign inversion is performed on the data when the corresponding symbol is "N." When the repetition count in the signal line 519 indicates the value "1," the reading sign inversion in the signal line 155 indicates "PPNP," and thus signifies that sign inversion is to be performed on only a third piece of data. When the repetition count in the signal line 519 indicates the value "2," the reading sign inversion in the signal line 155 indicates "NPPP," and thus signifies that sign inversion is to be performed on only a first piece of data. Similarly, when the repetition count in the signal line 519 indicates the value "3," sign inversion is to be performed on only a second piece of data. When the repetition count in the signal line 519 indicates the value "4," sign inversion is to be performed on the data other than a fourth piece of data.

The reading rearrangement in the signal line 154 and the reading sign inversion in the signal line 155 correspond to the combination order and signs of the elements of the quaternion product in the above-described Equation 1.

A value "5" indicating an inner product is output as the arithmetic unit specification in the signal line 156. This value does not depend on the repetition count in the signal line 519.

FIGS. 7A and 7B are diagrams of an example of control performed by the repetition control circuit 150 for another operation instruction in the embodiment of the present invention. FIG. 7A is a diagram of contents of the writing enable in the signal line 151 when the function code 210 represents an addition (add), a subtraction (sub), a multiplication (mul), a division (div), or a comparison (cmp). FIG. 7B is a diagram of contents of the writing enable in the signal line 151 when the function code 210 represents an inner product (dot).

Referring to FIG. 7A, in the case where the function code 210 represents an addition or the like, when the number of writing elements 223 in the signal line 138 is a value "1," only the first bit of the writing enable in the signal line 151 is a value "1," and the other bits of the writing enable are a value "0." When the number of writing elements 223 in the signal line 138 is a value "2," the first bit and the second bit of the writing enable in the signal line 151 are the value "1," and the other bits of the writing enable are the value "0." When the number of writing elements 223 in the signal line 138 is a value "3," only the fourth bit of the writing enable in the signal line 151 is the value "0," and the other bits of the writing enable are the value "1." When the number of writing elements 223 in the signal line 138 is a value "4," all the bits of the writing enable in the signal line 151 are the value "1."

Referring to FIG. 7B, in the case where the function code 210 represents an inner product, when the writing element specification 232 in the signal line 138 is a value "X," only the first bit of the writing enable in the signal line 151 is a value "1," and the other bits of the writing enable are a value "0." When the writing element specification 232 in the signal line 138 is a value "Y," only the second bit of the writing enable in the signal line 151 is the value "1," and the other bits of the writing enable are the value "0." When the writing element specification 232 in the signal line 138 is a value "Z," only the third bit of the writing enable in the signal line 151 is the value "1," and the other bits of the writing enable are the value "0." When the writing element specification 232 in the signal line 138 is a value "W," only the fourth bit of the writing enable in the signal line 151 is the value "1," and the other bits of the writing enable are the value "0."

FIG. 8 is a diagram of another example of control performed by the repetition control circuit 150 for another operation instruction in the embodiment of the present invention. When the function code 210 represents an addition, a subtraction, a multiplication, a division, a comparison, or an inner product, the repetition count in the signal line 519 indicates a value "1" at all times, the reading rearrangement in the signal line 154 indicates "XYZW," and the reading sign inversion in the signal line 155 indicates "PPPP." This means that a plurality of repetitions are not performed in the arithmetic unit 180, and that the rearrangement and sign inversion of the read data are not performed either.

However, the arithmetic unit specification for the arithmetic unit 180 via the signal line 156 is necessary. A value "0" is specified in the case of an addition. A value "1" is specified in the case of a subtraction. A value "2" is specified in the case of a multiplication. A value "3" is specified in the case of a division. A value "4" is specified in the case of a comparison. A value "5" is specified in the case of an inner product.

Figure 9:
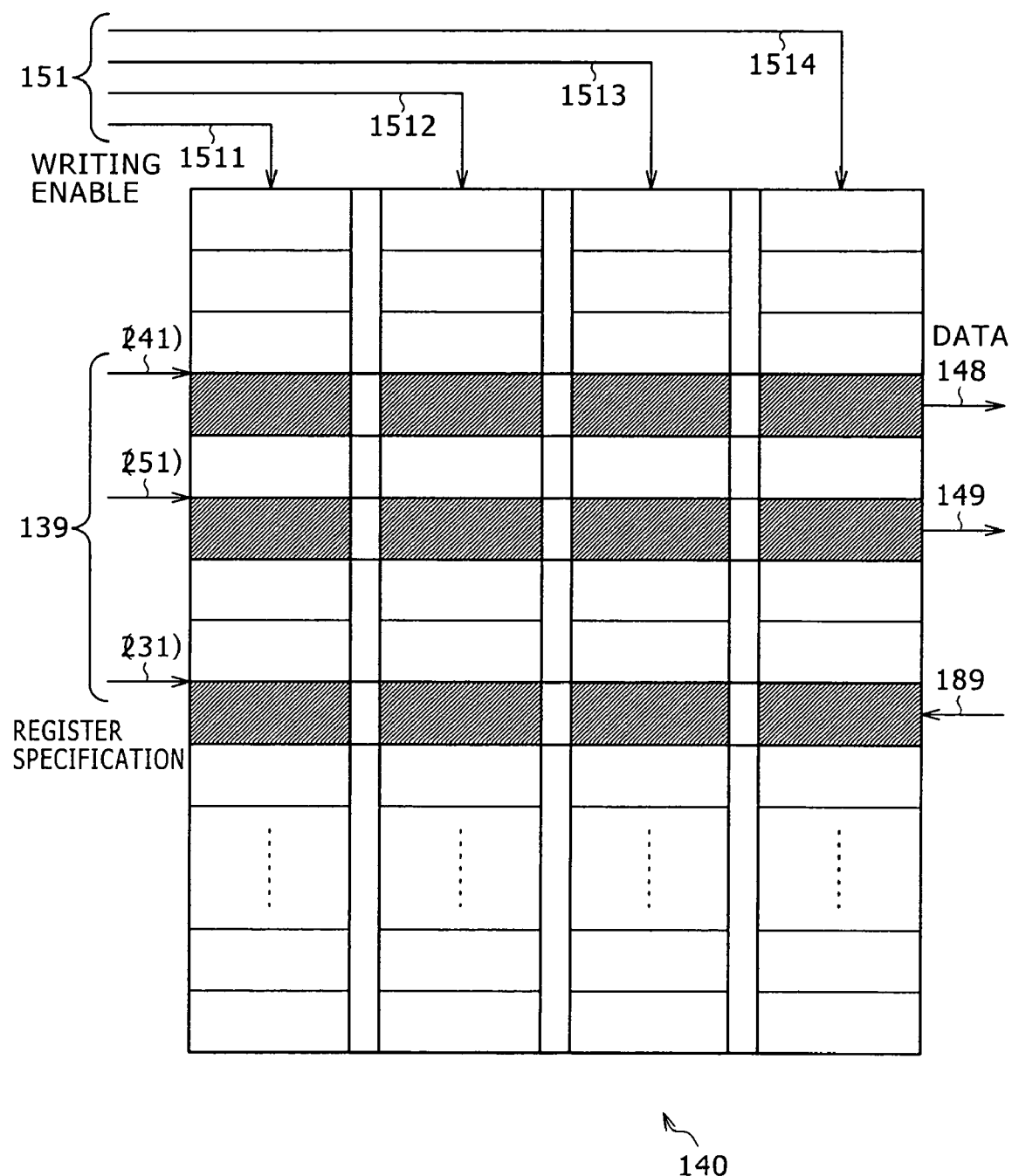
FIG. 9 is a diagram showing an example of configuration of a register file in the embodiment of the present invention.

FIG. 9 is a diagram showing an example of configuration of the register file 140 in the embodiment of the present invention. The register file 140 is provided with addresses in a vertical direction with four elements accessed simultaneously in a horizontal direction as one register. Suppose in this case that the x-component of a quaternion is retained in a first element from a left, that the y-component of the quaternion is retained in a second element, that the z-component of the quaternion is retained in a third element, and that the w-component (scalar component) of the quaternion is retained in a fourth element.

An access address in the register file 140 is supplied by the instruction decoder 130 via the signal line 139. In the signal line 139, the first reading register specification 241 and the second reading register specification 251 indicate a reading address, and the writing register specification 231 indicates a writing address. Data retained at the address indicated by the first reading register specification 241 is output from the signal line 148. Similarly, data retained at the address indicated by the second reading register specification 251 is output from the signal line 149.

Data supplied from the signal line 189 is retained at the address indicated by the writing register specification 231. At this time, whether to retain corresponding data is controlled according to the writing enable in the signal line 151. Specifically, when the first bit 1511 of the writing enable indicates a value "1," data is written to a corresponding first element. When the first bit 1511 of the writing enable indicates a value "0," data is not written to the corresponding first element. The same being true for the other bits, when the second to fourth bits of the writing enable indicate a value "1," data is written to corresponding elements, and when the second to fourth bits of the writing enable indicate a value "0," data is not written to the corresponding elements.

Figure 10:
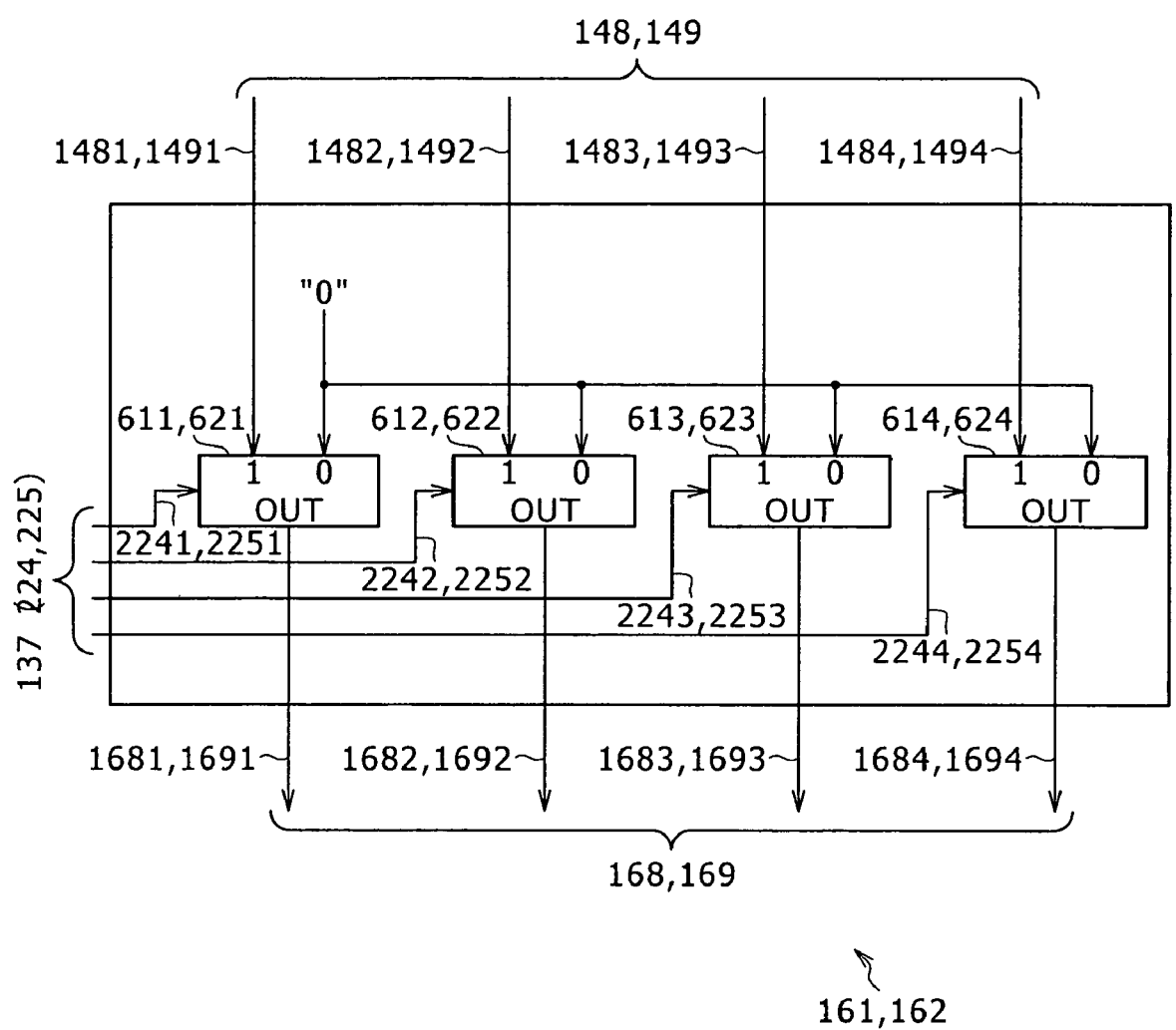
FIG. 10 is a diagram showing an example of configuration of a size processing circuit in the embodiment of the present invention.

FIG. 10 is a diagram showing an example of configuration of the size processing circuit 161 or 162 in the embodiment of the present invention. The size processing circuit 161 or 162 includes two-input selectors 611 to 614 or 621 to 624, respectively.

The two-input selectors 611 to 614 each select one of four pieces of data 1481 to 1484 supplied from the register file 140 via the signal line 148 and a value "0" according to the number of first reading elements 224 in the signal line 137. Similarly, the two-input selectors 621 to 624 each select one of four pieces of data 1491 to 1494 supplied from the register file 140 via the signal line 149 and a value "0" according to the number of second reading elements 225 in the signal line 137. At this time, the number of first reading elements 224 and the number of second reading elements 225 have relations with selection signals (reading enable) to the two-input selectors 611 to 614 and 621 to 624 as shown in FIG. 11.

FIG. 11 is a diagram showing an example of contents of the selection signals in the size processing circuit 161 or 162 in the embodiment of the present invention.

Specifically, when the number of first reading elements 224 in the signal line 137 is a value "1," only the reading enable 2241 for the two-input selector 611 is a value "1," and the other signals are a value "0." Thereby, the value of a signal line 1481 is output to a signal line 1681, and the value "0" is output to signal lines 1682 to 1684. When the number of first reading elements 224 in the signal line 137 is a value "2," the reading enables 2241 and 2242 for the two-input selectors 611 and 612 are the value "1," and the other signals are the value "0." Thereby, the values of the signal line 1481 and a signal line 1482 are output to the signal lines 1681 and 1682, respectively, and the value "0" is output to the signal lines 1683 and 1684. When the number of first reading elements 224 in the signal line 137 is a value "3," the reading enable 2244 for the two-input selector 614 is the value "0," and the other signals are the value "1." Thereby, the values of the signal lines 1481 to 1483 are output to the signal lines 1681 to 1683, respectively, and the value "0" is output to the signal line 1684. When the number of first reading elements 224 in the signal line 137 is a value "4," all the reading enables 2241 to 2244 for the two-input selectors 611 to 614 are the value "1." Thereby, the values of the signal lines 1481 to 1484 are output to the signal lines 1681 to 1684, respectively, as they are.

Similarly, when the number of second reading elements 225 in the signal line 137 is a value "1," only the reading enable 2251 for the two-input selector 621 is a value "1," and the other signals are a value "0." Thereby, the value of a signal line 1491 is output to a signal line 1691, and the value "0" is output to signal lines 1692 to 1694. When the number of second reading elements 225 in the signal line 137 is a value "2," the reading enables 2251 and 2252 for the two-input selectors 621 and 622 are the value "1," and the other signals are the value "0." Thereby, the values of the signal line 1491 and a signal line 1492 are output to the signal lines 1691 and 1692, respectively, and the value "0" is output to the signal lines 1693 and 1694. When the number of second reading elements 225 in the signal line 137 is a value "3," the reading enable 2254 for the two-input selector 624 is the value "0," and the other signals are the value "1." Thereby, the values of the signal lines 1491 to 1493 are output to the signal lines 1691 to 1693, respectively, and the value "0" is output to the signal line 1694. When the number of second reading elements 225 in the signal line 137 is a value "4," all the reading enables 2251 to 2254 for the two-input selectors 621 to 624 are the value "1." Thereby, the values of the signal lines 1491 to 1494 are output to the signal lines 1691 to 1694, respectively, as they are.

By thus setting the value "0" to a part exceeding the number of elements (size) in the size processing circuits 161 and 162, a sum of results of multiplication of four elements can be made to represent an inner product even when the number of elements is smaller than four. In addition, by setting unnecessary elements to zero in such a case, it is possible to prevent unnecessary operation of the arithmetic unit and thus reduce power consumption.

Figure 12:
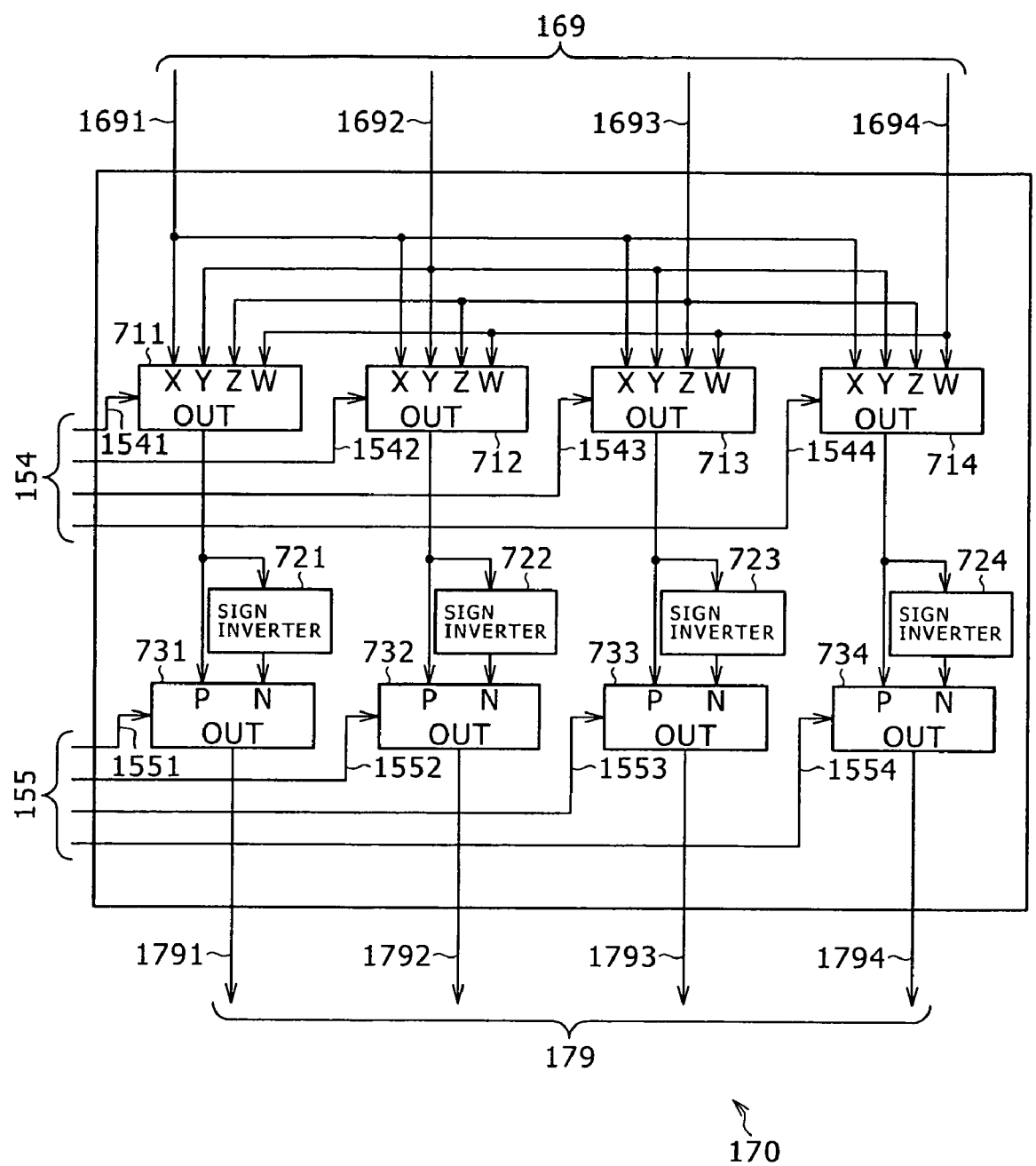
FIG. 12 is a diagram showing an example of configuration of a data manipulating circuit in the embodiment of the present invention.

FIG. 12 is a diagram showing an example of configuration of the data manipulating circuit 170 in the embodiment of the present invention. The data manipulating circuit 170 includes four four-input selectors 711 to 714, four sign inverters 721 to 724, and four two-input selectors 731 to 734.

Each of the four-input selectors 711 to 714 selects one of four pieces of data 1691 to 1694 supplied from the size processing circuit 162 via the signal line 169 according to reading rearrangements 1541 to 1544 in the signal line 154. The reading rearrangements 1541 to 1544 in the signal line 154 are supplied from the repetition control circuit 150, and each indicate which component to select, as described with reference to FIG. 6 and FIG. 8. Thus, the four-input selectors 711 to 714 rearrange the data.

The sign inverters 721 to 724 invert the signs of outputs of the four-input selectors 711 to 714, respectively. Then, the two-input selectors 731 to 734 respectively select either values that have gone through the sign inverters 721 to 724 or values as they are that have not gone through the sign inverters 721 to 724 according to reading sign inversions 1551 to 1554 in the signal line 155. The reading sign inversions 1551 to 1554 in the signal line 155 are supplied from the repetition control circuit 150, and each indicate whether to invert the sign, as described with reference to FIG. 6 and FIG. 8. Thus, the sign inverters 721 to 724 and the two-input selectors 731 to 734 invert the signs of the data, and then output four pieces of data 1791 to 1794 via the signal line 179.

Figure 13:
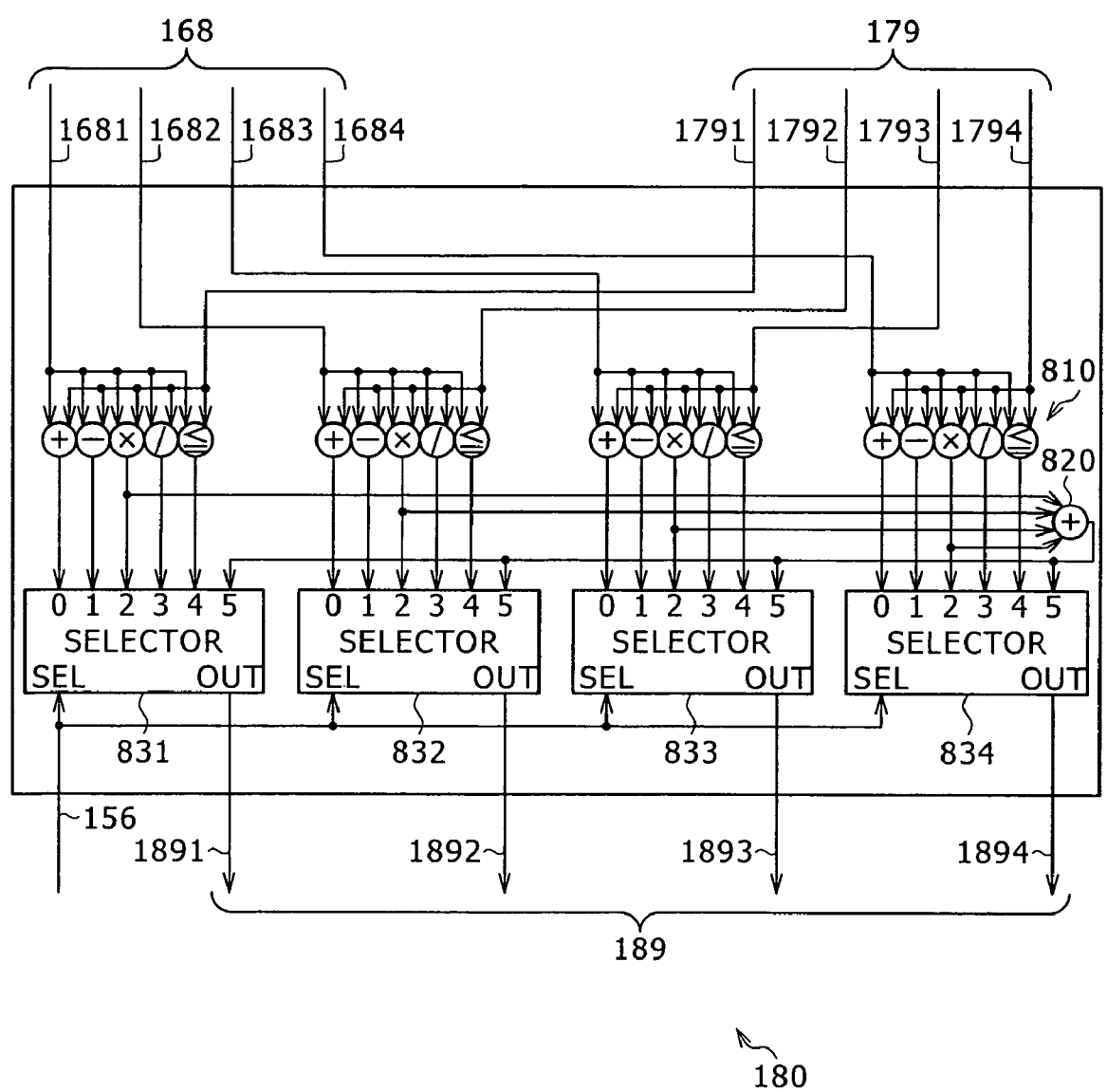
FIG. 13 is a diagram showing an example of configuration of an arithmetic unit in the embodiment of the present invention.

FIG. 13 is a diagram showing an example of configuration of the arithmetic unit 180 in the embodiment of the present invention. The arithmetic unit 180 includes four arithmetic circuit groups 810, an adder 820, and four operation result selectors 831 to 834.

The arithmetic circuit groups 810 are provided so as to correspond to four pairs of input operands. Each of the arithmetic circuit groups 810 includes an adder, a subtracter, a multiplier, a divider, and a comparator, for example. The adder 820 receives respective outputs of the multipliers in the four arithmetic circuit groups 810, and calculates a sum of four multiplication results. That is, an output of the adder 820 represents a result of product-sum operation.

The operation result selectors 831 to 834 select results of operation by the arithmetic circuit groups 810 and the adder 820 according to the arithmetic unit specification supplied from the repetition control circuit 150 via the signal line 156, and output a result of the selection to the signal line 189 (1891 to 1894). For example, when the arithmetic unit specification is "0," the operation result selectors 831 to 834 select results of addition by the arithmetic circuit groups 810. When the arithmetic unit specification is "1," the operation result selectors 831 to 834 select results of subtraction by the arithmetic circuit groups 810. When the arithmetic unit specification is "2," the operation result selectors 831 to 834 select results of multiplication by the arithmetic circuit groups 810. When the arithmetic unit specification is "3," the operation result selectors 831 to 834 select results of division by the arithmetic circuit groups 810. When the arithmetic unit specification is "4," the operation result selectors 831 to 834 select results of comparison by the arithmetic circuit groups 810. When the arithmetic unit specification is "5," the operation result selectors 831 to 834 select a result of product-sum operation by the adder 820.

In the SIMD type computer system formed as described above, a quaternion product instruction (qmul) assigns the four components of quaternions P and Q to the elements of respective four-dimensional vectors, and generates a quaternion product PQ. Specifically, a four-dimensional vector stored in components X, Y, Z, and W in the register file 140 in order of Ax, Ay, Az, and Aw is specified by the first reading operand 240. A four-dimensional vector stored in components X, Y, Z, and W in the register file 140 in order of Bx, By, Bz, and Bw is specified by the second reading operand 250. Then, the size 220 is set to a value "4." Thus, a quaternion product PQ is obtained in order of Mx, My, Mz, and Mw in components X, Y, Z, and W of the specified writing operand 230 in the register file 140.

Using an inner product and an outer product of Three-dimensional vectors U and V, the product PQ of the quaternion P and the quaternion Q can be expressed as $$PQ=[pq-U \cdot V;\ pV+qU+U \times V]$$

where $\cdot$ denotes an inner product, and $\times$ denotes an outer product.

Assuming that p=0 and that q=0, the product of the quaternions P and Q in this case is $$PQ=[-U \cdot V;\ U \times V]$$

It is understood that the components of this product PQ form the outer product of U and V itself. That is, $$\begin{aligned}PQ &= (AyBz - AzBy)i \\ &+ (-AxBz + AzBx)j \\ &+ (AxBy - AyBx)k \\ &= Nxi + Nyj + Nzk\end{aligned}$$

Specifically, when the size 220 is set to a value "3" and a quaternion product instruction is executed, a register specified by the first reading operand 240 and a register specified by the second reading operand 250 both have a component W set to zero by the size processing circuits 161 and 162. Since the value "3" of the size 220 is also set as the number of repetitions 226, the repetition count 519 by the repetition counter 510 is "1," "2," or a maximum of "3." An operation is performed on components X, Y, and Z three times in respective settings to calculate Mx, My, and Mz. For coefficients (Nx, Ny, and Nz) in this case, p=0 and q=0 because both the components W are zero, and an outer product of three-dimensional vectors (Ax, Ay, Az) and (Bx, By, Bz) is calculated.

Thus, according to the embodiment of the present invention, a quaternion product can be calculated by repeating a product-sum operation on two four-dimensional vectors four times by the repetition control circuit 150 while data manipulation is performed on one of the vectors. It is therefore possible to calculate a quaternion product with a single quaternion product instruction without combining a plurality of instructions, so that program size can be reduced, and efficiency of use of an instruction cache can be improved. In addition, since a register for retaining intermediate data subjected to rearrangement and sign inversion does not need to be provided, efficiency of use of the register can be improved.

Further, an outer product can be calculated by applying three-dimensional vectors in the same configuration as the configuration for calculating the quaternion product. Specifically, when a quaternion product instruction (qmul) is specified in the function code 210, a quaternion product can be calculated by setting the size 220 to a value "4." An outer product can be calculated by setting the size 220 to a value "3."

It is to be noted that while the embodiment of the present invention represents an example for embodying the present invention, and has correspondences with specific inventive items as illustrated in the following, the present invention is not limited to this, and various modifications may be made without departing from the spirit of the present invention.

The data manipulating means corresponds to the data manipulating circuit 170, for example. The arithmetic means corresponds to the arithmetic unit 180, for example. The repetition control means corresponds to the repetition control circuit 150, for example.

The rearranging means corresponds to the selectors 711 to 714, for example. The sign inverting means corresponds to the sign inverters 721 to 724 and the selectors 731 to 734, for example.

The counting means corresponds to the repetition counter 510, for example. The operation control means corresponds to the operation control circuit 520, for example.

The size processing means corresponds to the size processing circuits 161 and 162, for example.

The vector retaining means corresponds to the register file 140, for example. The data manipulating means corresponds to the data manipulating circuit 170, for example. The arithmetic means corresponds to the arithmetic unit 180, for example. The repetition control means corresponds to the repetition control circuit 150, for example.

The vector retaining means corresponds to the register file 140, for example. The extracting means corresponds to the instruction decoder 130, for example. The first supplying means corresponds to the register file 140, for example. The second supplying means corresponds to the data manipulating circuit 170, for example. The arithmetic means corresponds to the arithmetic unit 180, for example.

The extracting means corresponds to the instruction decoder 130, for example. The arithmetic means corresponds to the arithmetic unit 180, for example.

It is to be noted that the process procedures described in the embodiment of the present invention may be construed as a method having the series of procedures, or may be construed as a program for making a computer perform the series of procedures or a recording medium storing the program.

As examples of practical use of the present invention, the present invention is applicable to SIMD type processors that perform vector operation, for example.

It should be understood by those skilled in the art that various modifications, combinations, sub-combinations and alterations may occur depending on design requirements and other factors insofar as they are within the scope of the appended claims or the equivalents thereof.

What is claimed is:

1. A processor comprising:
    data manipulating means for generating an arbitrary combination of elements of a first input vector and elements of a second input vector;
    arithmetic means for performing a product-sum operation on said combination; and
    repetition control means for controlling the generation of said combination by said data manipulating means and said product-sum operation by said arithmetic means according to a number of the elements of said first input vector and said second input vector.

2. The processor as claimed in claim 1, wherein said repetition control means includes:
    rearranging means for rearranging the elements of said second input vector under control of said repetition control means; and
    sign inverting means for inverting a sign of an output of said rearranging means under control of said repetition control means.

3. The processor as claimed in claim 2, wherein said repetition control means includes:
    counting means for counting a number of times corresponding to said number of the elements; and
    operation control means for controlling said rearranging means and said sign inverting means according to a count value of said counting means.

4. The processor as claimed in claim 1, wherein said second input vector has four elements (Bx, By, Bz, and Bw), and
    said data manipulating means sequentially generates a first sequence (Bw, Bz, −By, and Bx), a second sequence (−Bz, Bw, Bx, and By), a third sequence (By, −Bx, Bw, and Bz), and a fourth sequence (−Bx, −By, −Bz, and Bw) under control of said repetition control means.

5. The processor as claimed in claim 4, wherein said first input vector has four elements (Ax, Ay, Az, and Aw), and
    said arithmetic means sequentially performs a first product-sum operation (AxBw+AyBz−AzBy+AwBx), a second product-sum operation (−AxBz+AyBw+AzBx+AwBy), a third product-sum operation (AxBy−AyBx+AzBw+AwBz), and a fourth product-sum operation (−AxBx−AyBy−AzBz+AwBw) under control of said repetition control means.

6. The processor as claimed in claim 1, further comprising size processing means for setting zero to elements exceeding said number of the elements of each of said first input vector and said second input vector.

7. A processor comprising:
    vector retaining means for retaining a first input vector and a second input vector;
    data manipulating means for generating an arbitrary combination of elements of said first input vector and elements of said second input vector;

arithmetic means for performing a product-sum operation on said combination; and repetition control means for controlling the generation of said combination by said data manipulating means and said product-sum operation by said arithmetic means according to a number of the elements of said first input vector and said second input vector, and making a result of the product-sum operation retained as a predetermined element in an output vector of said vector retaining means.

8. A processor comprising:

vector retaining means for retaining a first input vector having four elements (Ax, Ay, Az, and Aw) and a second input vector having four elements (Bx, By, Bz, and Bw);

extracting means for extracting a number of the elements of said first input vector and said second input vector in an instruction to perform an operation between said first input vector and said second input vector;

first supplying means for supplying the elements (Ax, Ay, Az, and Aw) of said first input vector;

second supplying means for supplying a first sequence (Bw, Bz, −By, and Bx), a second sequence (−Bz, Bw, Bx, and By), a third sequence (By, −Bx, Bw, and Bz), and a fourth sequence (−Bx, −By, −Bz, and Bw) of the elements of said second input vector; and arithmetic means for sequentially performing a first product-sum operation (AxBw+AyBz−AzBy+AwBx), a second product-sum operation (−AxBz+AyBw+AzBx+AwBy), a third product-sum operation (AxBy−AyBx+AzBw+AwBz), and a fourth product-sum operation (−AxBx−AyBy−AzBz+AwBw) on a basis of the elements of said first input vector and said second input vector, the elements of said first input vector and said second input vector being supplied from said first supplying means and said second supplying means, when said number of the elements is four, and making said vector retaining means retain results of the product-sum operations.

9. The processor as claimed in claim 8, wherein said arithmetic means sequentially generates a first outer product element (AyBz−AzBy), a second outer product element (−AxBz+AzBx), and a third outer product element (AxBy−AyBx) on a basis of the elements of said first input vector and said second input vector, the elements of said first input vector and said second input vector being supplied from said first supplying means and said second supplying means, when said number of the elements is three, and makes said vector retaining means retain the outer product elements.

10. A processor having, as an instruction set, an instruction to perform an operation between a first input vector having four elements (Ax, Ay, Az, and Aw) and a second input vector having four elements (Bx, By, Bz, and Bw), said processor comprising:

extracting means for extracting a number of the elements of said first input vector and said second input vector in the instruction to perform the operation between said first input vector and said second input vector; and arithmetic means for sequentially performing a first product-sum operation (AxBw+AyBz−AzBy+AwBx), a second product-sum operation (−AxBz+AyBw+AzBx+AwBy), a third product-sum operation (AxBy−AyBx+AzBw+AwBz), and a fourth product-sum operation (−AxBx−AyBy−AzBz+AwBw) on a basis of the elements of said first input vector and said second input vector when said number of the elements is four, and calculating a quaternion product.

11. The processor as claimed in claim 10, wherein said arithmetic means sequentially generates a first outer product element (AyBz−AzBy), a second outer product element (−AxBz+AzBx), and a third outer product element (AxBy−AyBx) on a basis of the elements of said first input vector and said second input vector when said number of the elements is three, and calculates an outer product.

12. A processor comprising:

a data manipulator generating an arbitrary combination of elements of a first input vector and elements of a second input vector;

an arithmetic section performing a product-sum operation on said combination; and a repetition controller controlling the generation of said combination by said data manipulator and said product-sum operation by said arithmetic section according to a number of the elements of said first input vector and said second input vector.

13. A processor comprising:

a vector retainer retaining a first input vector and a second input vector;

a data manipulator generating an arbitrary combination of elements of said first input vector and elements of said second input vector;

an arithmetic section performing a product-sum operation on said combination; and a repetition controller controlling the generation of said combination by said data manipulator and said product-sum operation by said arithmetic section according to a number of the elements of said first input vector and said second input vector, and making a result of the product-sum operation retained as a predetermined element in an output vector of said vector retainer.

14. A processor comprising:

a vector retainer retaining a first input vector having four elements (Ax, Ay, Az, and Aw) and a second input vector having four elements (Bx, By, Bz, and Bw);

an extractor extracting a number of the elements of said first input vector and said second input vector in an instruction to perform an operation between said first input vector and said second input vector;

a first supplier supplying the elements (Ax, Ay, Az, and Aw) of said first input vector;

a second supplier supplying a first sequence (Bw, Bz, −By, and Bx), a second sequence (−Bz, Bw, Bx, and By), a third sequence (By, −Bx, Bw, and Bz), and a fourth sequence (−Bx, −By, −Bz, and Bw) of the elements of said second input vector; and an arithmetic section sequentially performing a first product-sum operation (AxBw+AyBz−AzBy+AwBx), a second product-sum operation (−AxBz+AyBw+AzBx+AwBy), a third product-sum operation (AxBy−AyBx+AzBw+AwBz), and a fourth product-sum operation (−AxBx−AyBy−AzBz+AwBw) on a basis of the elements of said first input vector and said second input vector, the elements of said first input vector and said second input vector being supplied from said first supplier and said second supplier, when said number of the elements is four, and making said vector retainer retain results of the product-sum operations.

15. A processor having, as an instruction set, an instruction to perform an operation between a first input vector having four elements (Ax, Ay, Az, and Aw) and a second input vector having four elements (Bx, By, Bz, and Bw), said processor comprising:

an extractor extracting a number of the elements of said first input vector and said second input vector in the instruction to perform the operation between said first input vector and said second input vector; and an arithmetic section sequentially performing a first product-sum operation (AxBw+AyBz−AzBy+AwBx), a second product-sum operation (−AxBz+AyBw+AzBx+AwBy), a third product-sum operation (AxBy−AyBx+AzBw+AwBz), and a fourth product-sum operation (−AxBx−AyBy−AzBz+AwBw) on a basis of the elements of said first input vector and said second input vector when said number of the elements is four, and calculating a quaternion product.

* * * * *